(12) United States Patent  
Lutz

(10) Patent No.: US 10,875,590 B2  
(45) Date of Patent: Dec. 29, 2020

(54) MODULAR BEAM HAULER

(71) Applicant: David W. Lutz, Carlisle, PA (US)

(72) Inventor: David W. Lutz, Carlisle, PA (US)

( * ) Notice: Subject to any disclaimer, the term of this patent is extended or adjusted under 35 U.S.C. 154(b) by 334 days.

(21) Appl. No.: 15/983,673

(22) Filed: May 18, 2018

(65) Prior Publication Data

US 2018/0339736 A1 Nov. 29, 2018

Related U.S. Application Data

(60) Provisional application No. 62/511,689, filed on May 26, 2017.

(51) Int. Cl.
| | |
|---|---|
| *B62D 59/04* | (2006.01) |
| *B62D 53/00* | (2006.01) |
| *B62D 13/04* | (2006.01) |
| *B60P 3/40* | (2006.01) |
| *B62D 63/06* | (2006.01) |

(52) U.S. Cl.
CPC .............. *B62D 53/005* (2013.01); *B60P 3/40* (2013.01); *B62D 13/04* (2013.01); *B62D 63/068* (2013.01)

(58) Field of Classification Search
CPC ..................................... B60P 3/40; B60D 5/00
See application file for complete search history.

(56) References Cited

U.S. PATENT DOCUMENTS

| | | | | | |
|---|---|---|---|---|---|
| 3,642,784 | A * | 2/1972 | Larson | .................. | C07C 205/58 549/482 |
| 3,695,373 | A * | 10/1972 | Bostrom | .................. | B60P 3/40 180/14.3 |
| 4,107,094 | A * | 8/1978 | Light | ...................... | A23G 4/06 424/49 |
| 4,762,192 | A * | 8/1988 | Maxwell | .................. | B60P 3/40 180/14.2 |
| 9,126,626 | B1 * | 9/2015 | Dieleman | ................ | B60P 3/40 |
| 9,630,664 | B2 | 4/2017 | Hellholm et al. | | |
| 10,086,888 | B2 * | 10/2018 | Trowbridge | ......... | B62D 53/062 |
| 2013/0236263 | A1 * | 9/2013 | Peterson | .................. | B60P 3/40 410/44 |
| 2014/0369779 | A1 * | 12/2014 | Randall | .................... | B60P 3/40 410/45 |
| 2015/0042069 | A1 * | 2/2015 | Nooren | .................... | B60G 9/02 280/419 |
| 2016/0257361 | A1 * | 9/2016 | Habernegg | ............ | B62D 61/10 |
| 2018/0162463 | A1 * | 6/2018 | Lutz | ....................... | B62D 33/02 |
| 2020/0070877 | A1 * | 3/2020 | Lutz | ..................... | B62D 13/025 |

* cited by examiner

*Primary Examiner* — Tony H Winner

(74) *Attorney, Agent, or Firm* — The Webb Law Firm

(57) ABSTRACT

A modular trailer includes: a front module including a frame, a plurality of axles connected to the frame, and a plurality of wheels connected to each axle; a rear module including a frame, a plurality of axles connected to the frame, and a plurality of wheels connected to each axle; a center module including a frame having a front end and a rear end, the front end removably pinned to the front module and the rear end removably pinned to the rear module, the center module further including a bearing rotatable relative to the frame; and a steering device operatively associated with the bearing and co-acting with at least one of the axles such that rotation of the bearing effects turning of the at least one axle. A towing system and a module of a modular trailer are also disclosed.

18 Claims, 17 Drawing Sheets

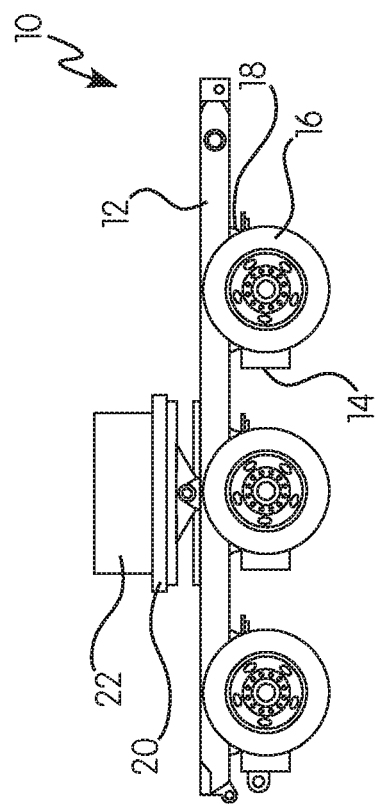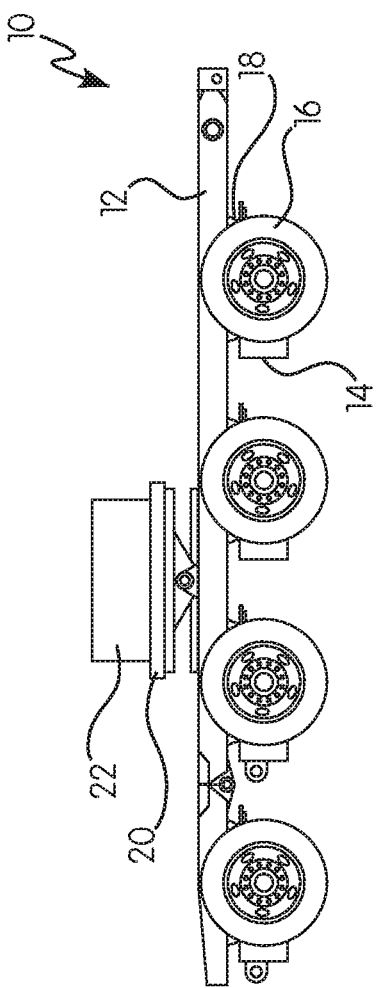
FIG. 1A
FIG. 1B

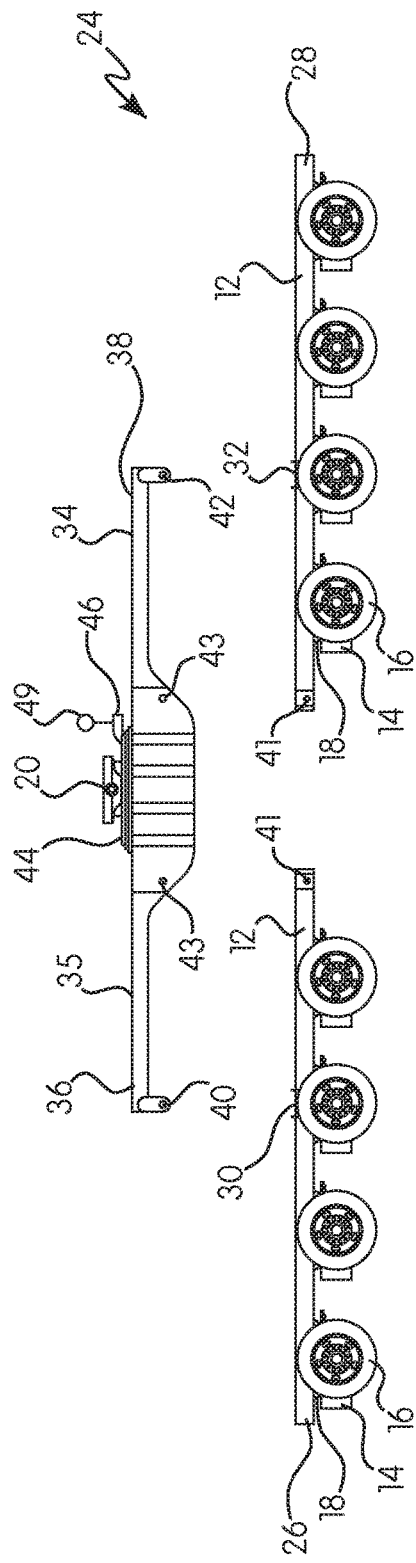
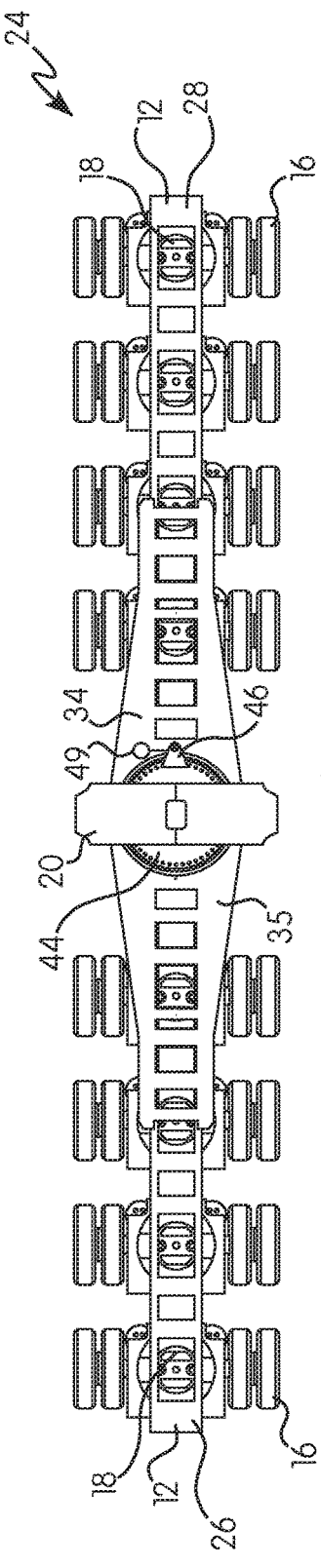
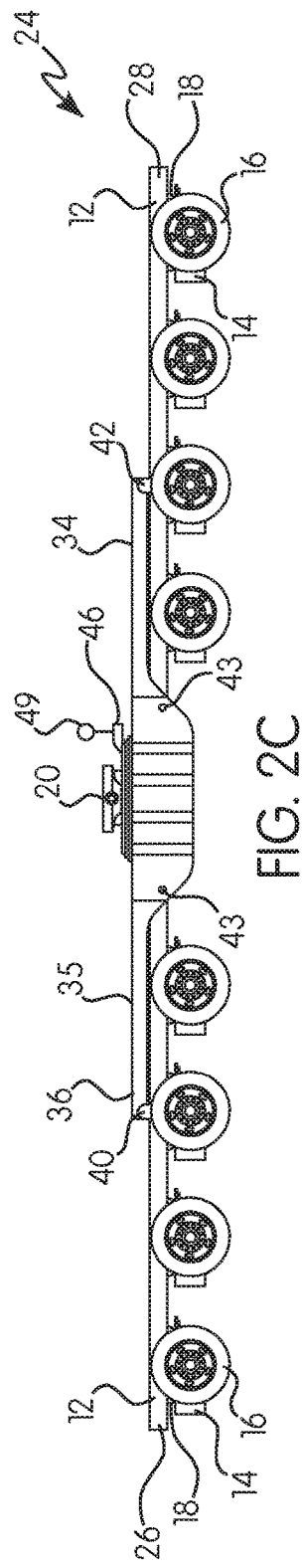
FIG. 2A
FIG. 2B
FIG. 2C

MODULAR BEAM HAULER

CROSS REFERENCE TO RELATED APPLICATIONS

This application claims priority to U.S. Provisional Patent Application No. 62/511,689, filed on May 26, 2017, the disclosure of which is hereby incorporated in its entirety by reference.

BACKGROUND OF THE INVENTION

Field of the Invention

The present invention relates to a modular trailer including a steering device for steering the modular trailer, as well as a module of the modular trailer and a towing system including the modular trailer.

Description of Related Art

Trailers are attachable to cabs to haul loads of various shapes and sizes. At times, the load to be carried is quite long. Sometimes, the load is too long for any single trailer unit to haul. Examples of such loads include long beams, such as long I-beams or beams used in the construction of bridges and other infrastructure. To carry these difficult loads, a towing system that includes a first trailer attached to a cab and a second trailer remote from the cab may be used, with the load spanning both the first and second trailer.

Certain towing systems use a second trailer that is not modular but formed as a single unit. Such second trailers are not sufficiently maneuverable and cannot be separated into modules.

In commercially available towing systems that do include modularity, the steering system is not optimally maneuverable. For each module, all of the axles turn on a single block and cannot be turned individually. This leads to decreased maneuverability of the towing system and the inability to turn the axles while the towing system is stationary. Thus, even the modular second trailers in these towing systems can be difficult to steer when carrying large loads, making transportation of the load more difficult, time consuming, and expensive.

SUMMARY OF THE INVENTION

The present invention is directed to a modular trailer including: a front module including a frame, a plurality of axles connected to the frame, and a plurality of wheels connected to each axle; a rear module including a frame, a plurality of axles connected to the frame, and a plurality of wheels connected to each axle; a center module including a frame having a front end and a rear end, the front end removably pinned to the front module and the rear end removably pinned to the rear module, the center module further including a bearing rotatable relative to the frame; and a steering device operatively associated with the bearing and co-acting with at least one of the axles such that rotation of the bearing effects turning of the at least one axle.

The present invention is also directed to a towing system including: a cab; at least one trailer; and a load received by the at least one trailer. The at least one trailer includes: a front module including a frame, a plurality of axles connected to the frame, and a plurality of wheels connected to each axle; a rear module including a frame, a plurality of axles connected to the frame, and a plurality of wheels connected to each axle; a center module including a frame having a front end and a rear end, the front end removably pinned to the front module and the rear end removably pinned to the rear module, the center module further including a bearing rotatable relative to the frame; and a steering device operatively associated with the bearing and co-acting with at least one of the axles such that rotation of the bearing effects turning of the at least one axle.

The present invention is also directed to a module of a modular trailer including: a frame; a plurality of axles connected to the frame; a plurality of wheels connected to each axle; and a power unit. Each axle of the plurality of axles is configured to turn individually relative to the frame, and the power unit is configured to cause each of the axles to turn.

BRIEF DESCRIPTION OF THE DRAWING

FIG. 1A shows a side view of a 3-axle dolly;
FIG. 1B shows a side view of a 4-axle dolly;
FIG. 2A shows a side view of a disassembled 8-axle trailer;
FIG. 2B shows a plan view of the assembled trailer of FIG. 2A;
FIG. 2C shows a side view of the assembled trailer of FIG. 2A.

DESCRIPTION OF THE INVENTION

Figure 3A:
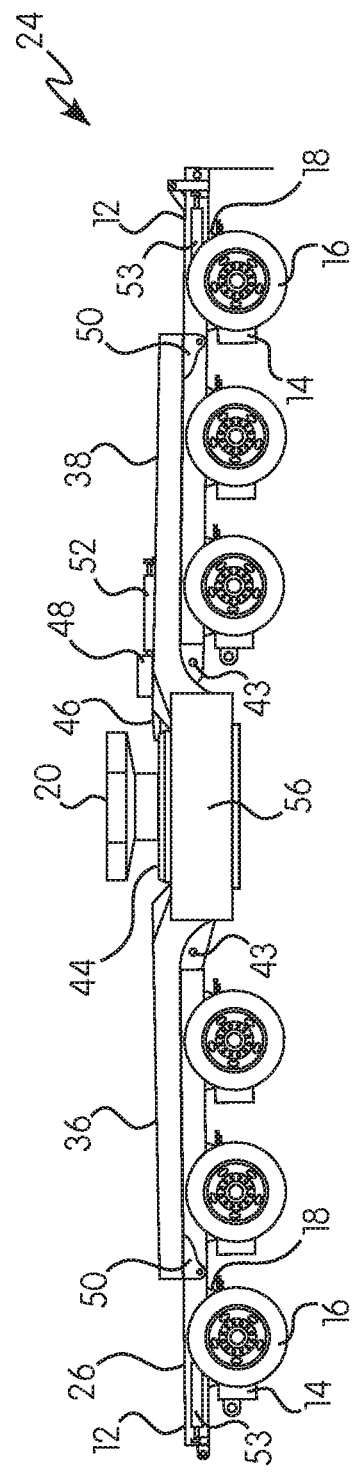
FIG. 3A shows a side view of a 6-axle trailer.

For the purpose of the following detailed description, it is to be understood that the invention may assume various alternative variations and step sequences, except where expressly specified to the contrary. Moreover, other than in any operating examples, or where otherwise indicated, all numbers used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Referring to FIGS. 1A and 1B, non-limiting embodiments of a dolly 10 are shown. The dolly 10 may include a frame 12 configured for supporting a load. The frame 12 may be a flatbed configured for towing. The dolly 10 may include a plurality of axles 14 connected to the frame 12, and each axle 14 may be connected to a plurality of wheels 16. The axles 14 may be turning or non-turning axles. The axles 14 may turn individually and in combination relative to the frame 12. In some non-limiting embodiments, the dolly 10 may include three axles 14 (see FIG. 1A) or four axles 14 (see FIG. 1B); however, it will be appreciated that the dolly 10 may have any number of axles 14 sufficient for allowing the dolly 10 to drive on a road towing a load. The dolly 10 may include an individual turntable 18 connected to each individual axle 14 so that each axles 14 may turn independently of the other axles relative to the frame. The turntable 18 may be disposed between the axle 14 and the frame 12. The turntable 18 may be configured to turn the axle 14 relative to the frame 12 by rotation of the turntable 18. The dolly 10 may also include a platform 20 connected to the frame 12. The platform 20 may be configured to receive a load 22 and secure the load 22 to the frame 12 for towing. The platform 20 may include a lift box (not shown), which allows the height of the platform 20 to be adjusted vertically, so that the distance of the platform from the frame 12 may be adjusted. The dolly 10 may be connected to a cab (not shown) to haul various loads 22. The dolly 10 may be used by itself as a trailer to haul the loads 22, or the dolly 10 may be connected to other dollies 10 (as a module) to form a larger trailer to haul the loads 22, as described herein.

Referring to FIGS. 2A-4B, the dollies 10 described in FIGS. 1A-1B may be modules of a trailer 24, which is larger than the individual dollies 10 to haul larger loads 22. In some non-limiting embodiments, the trailer 24 may be configured to haul long beams, such as long I-beams or beams used in the construction of bridges and other infrastructure. However, the trailer 24 may be configured to carry other loads, large or small, or loads of an unusual shape.

With continued reference to FIGS. 2A-4B, the trailer 24 includes a front module 26, and a rear module 28. In some non-limiting embodiments, the front module 26 and the rear module 28 include identical components and designs of the dollies 10 of FIGS. 1A and 1B. The front module 26 may be configured closer to a cab, when being used for hauling, than the rear module 28. The front module 26 and rear module 28 may include a front pin receiver 30 and a rear pin receiver 32, respectively. These pin receivers 30, 32 may be configured to receive a pin or other attachment member so that other components can be connected to the front module 26 and rear module 28. The front module 26 and the rear module 28 may further include a receiving hole 41 for receiving a pin.

The trailer 24 may also include a center module 34. The center module 34 may include a center frame 35 configured for supporting a load 22. The center module 34 may be connected to the front module 26 and the rear module 28 to form the trailer 28. The center module 34 may include a front end 36 disposed near the front module 26 when the center module 34 is connected to the front module 26 and the rear module 28 to form the trailer 24. The center module may include a rear end 38 disposed near the rear module 28 when the center module 34 is connected to the front module 26 and the rear module 28 to form the trailer 24. As shown in FIGS. 3A-4B, the front module 26 and the rear module 28 may each be the three or four axle dollies from FIGS. 1A and 1B to form a six or eight axle trailer 24. However, it will be appreciated that dollies with different numbers of axles 14 may be used to form a trailer 24 with the number of axles 14 being sufficient for allowing the trailer 24 to drive on a road towing a load 22.

Referring to FIG. 2A-2C, the center module 34 may include a front pin 40 and a rear pin 42. To connect the center module 34 to the front module 26, the front pin 40 may be received by the front pin receiver 30 and then fastened to the front pin receiver 30 using any fastening means, such as a screw or bolt. The front pin 40 may be removably received by the front pin receiver 30 such that the center module 34 may be pinned and detached from the front module 26 any number of times over the life of these components. This allows the trailer 24 to be made longer when needed or disassembled when it is not necessary to haul a large load 22. To connect the center module 34 to the rear module 28, the rear pin 42 may be received by the rear pin receiver 32 and then fastened to the rear pin receiver 32 using any fastening means, such as a screw or bolt. The rear pin 42 may be removably received by the rear pin receiver 32 such that the center module 34 may be pinned and detached from the rear module 28 any number of times over the life of these components. This allows the trailer 24 to be made longer, when needed or disassembled when it is not necessary to haul a large load 22. The front pin 40 and rear pin 42 may be received by the front pin receiver 30 and rear pin receiver 32, respectively, such that the front pin 40 and rear pin 42 can rock back and forth during transportation to allow for increased maneuverability of the trailer 24.

In some non-limiting embodiments, and as shown in FIG. 2A-2C, the front end 36 of the center module 34 may be pinned in line with an axle 14 of the front module 26, and the rear end 38 of the center module 34 may be pinned in line with an axle 14 of the rear module 28. In other words, the front pin receiver 30 and the rear pin receiver 32 may be positioned directly over an axle 14 such that the front pin 40 and rear pin 42, when inserted into the pin receivers 30, 32, are positioned directly over an axle 14. However, in other non-limiting embodiments, the pinning may not be in line with an axle 14.

The center module 34 may further include at least one center pin 43, which may co-act with the receiving holes 41 of the front module 26 and the rear module 28 to provide a more rigid connection of the front module 26, the rear module 28, and the center module 34.

Figure 3B:
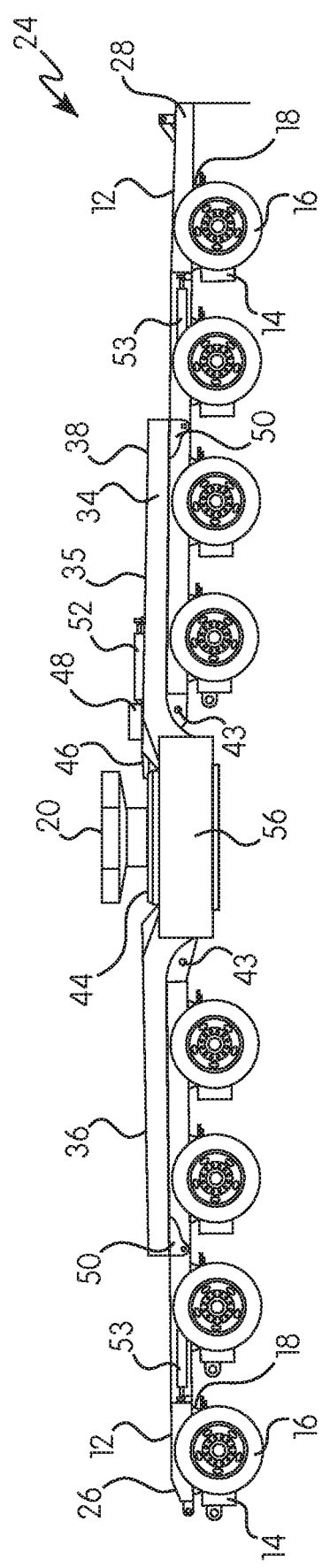
FIG. 3B shows a side view of an 8-axle trailer.

Referring to FIGS. 3A and 3B, the center module 34 may be connected to the front module 26 and rear module 28 using any other pin arrangement 50 that is sufficient to securely connect the center module 34 to the front module 26 and the rear module 28.

Whether the center module 34 is connected to the front module 26 or the rear module 28 using the configuration shown in FIGS. 2A-2C or FIGS. 3A and 3B or any other conceivable arrangement, the center module 34 may be pinned to the front module 26 and the rear module 28 such that the pinned center module 34, front module 26, and rear module 28 together form a rigid frame unit to form the trailer 24. A rigid frame unit means that the center module 34, front module 26, and rear module 28 are securely connected so as to move as a single unit and stably support a load 22 placed thereon. The connection may be tight between the components so that they do no move independently from one another but move as the rigid frame unit.

With continued reference to FIGS. 2A-4B, the center module 34 may include a bearing 44, which in some non-limiting embodiments may be a ring bearing 44. The ring bearing 44 may be disposed within the frame 35 of the center module. In some non-limiting embodiments, the ring bearing 44 may be arranged in the center (lengthwise) of the center module 34 such that it is proximate the center (lengthwise) of the assembled trailer 24. The ring bearing 44 may be rotatable relative to the center frame 35. The ring bearing 44 may be circular.

Figure 4A:
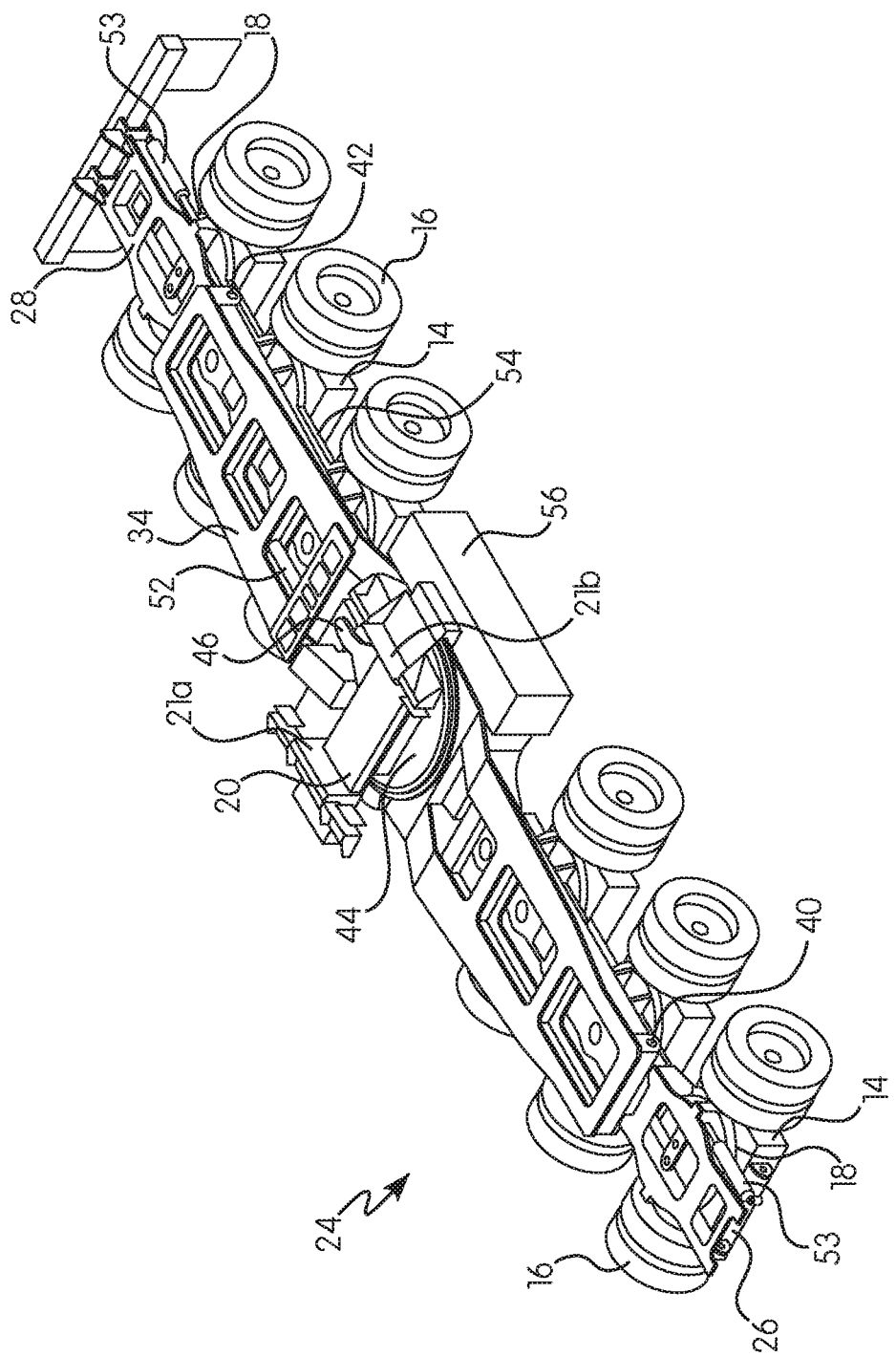
FIG. 4A shows a perspective view of a 6-axle trailer.
Figure 4B:
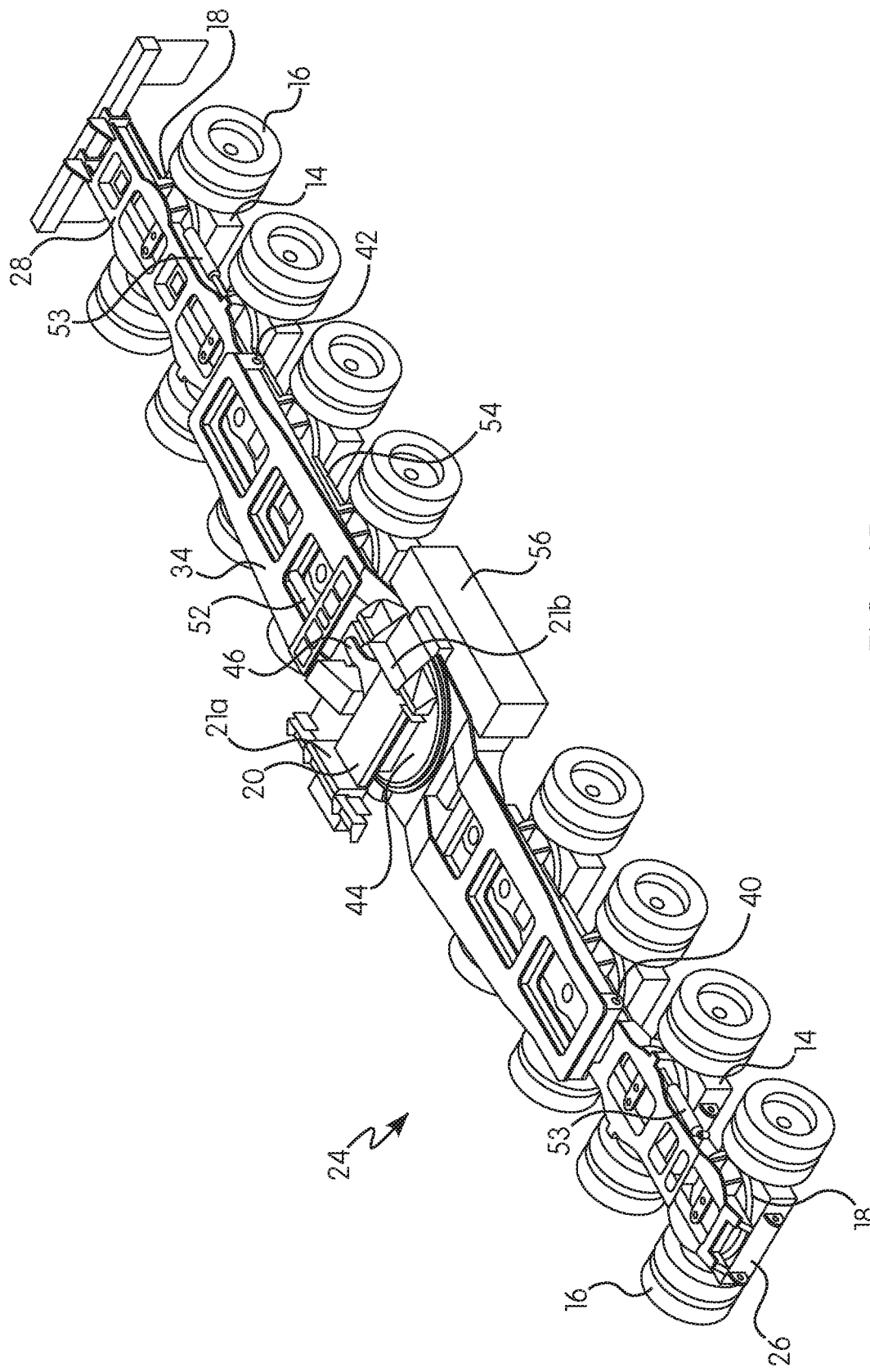
FIG. 4B shows a perspective view of an 8-axle trailer.

The platform 20 may be connected to the ring bearing 44 to receive the load 22, such as connected to the center of the ring bearing 44. The platform 20 may be configured to receive a beam for towing. The platform 20 may be any other shape depending on the load 22. In some non-limiting examples, the platform 20 may be adjustable depending on the shape of the load. For example, as shown in FIGS. 4A-4B, the platform 20 may include adjustable walls 21a, 21b, which may be moved toward or away from each other in order to clamp against the load (not shown). It will be appreciated that the platform 20 may include other adjustable arrangements capable of securing the load to the platform 20.

A steering device may be operatively associated with the ring bearing 44 and co-acting with at least one of the axles 14 such that rotation of the ring bearing 44 effects turning of the at least one axle 14. In some non-limiting examples, the steering device includes a bellcrank 48 connected to the ring bearing 44. In other non-limiting examples the steering device includes a sensor 49 configured to sense a degree of rotation of the ring bearing 44.

In the bellcrank arrangement, a clip 46 may be connected to the ring bearing 44. The clip 46 may be connected to the ring bearing 44 proximate the edge of the ring bearing 44. In some non-limiting embodiments, the clip 46 may be arranged at the edge of the ring bearing 44 proximate the rear module 28 when the components are connected to form the trailer 24. In some non-limiting embodiments, the clip 46 is arranged at the edge of the ring bearing 44 proximate the front module 26 when the components are connected to form the trailer 24. As shown in FIGS. 3A and 3B, the clip 46 may be connected to a bellcrank 48.

Referring to FIGS. 3A-4B, a ring bearing 44-bellcrank 48 steering arrangement used in one non-limiting embodiment of the trailer 24 is shown. As previously described, the clip 46 may be connected to the bellcrank 48 on one end. In one non-limiting embodiment, the other end of the bellcrank 48 may be connected to a plurality of sensing cylinders 52. The sensing cylinders 52 may be connected to the bellcrank on one end 48 and to the frame 35 on the other end. The sensing cylinders 52 may also be connected to a steering cylinder 53 by a hose (not shown), which allows oil from the sensing cylinders 52 to be in fluid communication with the steering cylinder 53 The steering cylinder 53 may be connected to at least one of the turntables 18. The steering cylinder 53 may be positioned on the front module 26 and/or the rear module 28.

To steer the trailer 24, rotation of the ring bearing 44 may cause the clip 46 to rotate with the ring bearing 44. Movement of the clip 46 causes movement of the bellcrank 48 which causes expansion or compression of the sensing cylinders 52. Movement of the sensing cylinders 52 causes oil from the steering cylinders 52 to be displaced to/from the steering cylinder 53, which, in turn, causes rotation of the turntable 18 co-acting with the at least one axle 14, and rotation of the turntable 18 causes the at least one axle 14 to turn, which turns the wheels 16 attached thereto. In some non-limiting embodiments, the steering cylinder 53 is attached to the turntable 18 of the axle 14 closest to the bellcrank 48. In some non-limiting embodiments, the steering cylinder 53 is attached to the turntable 18 of the axle 14 farthest to the bellcrank 48 (see FIGS. 3A-4B). In the non-limiting embodiments shown, the steering arrangement is shown arranged on the rear module 28. In other words, the bellcrank 48 and sensing cylinders 52 co-act with the steering cylinder 53, a turntable 18, and an axle 14 of the rear module 28. However, the steering arrangement may be on the front module 26, with the bellcrank 48 and sensing cylinders 52 co-acting with the steering cylinder 53, a turntable 18, and an axle 14 of the front module 26.

Using FIG. 4A as an illustration of this example, the left side of FIG. 4A may be proximate the front (closer to the cab) while the right side of FIG. 4A may be proximate the back (away from the cab), and the platform 20 may support the end portion of the beam. A left turn by the cab may pull the beam to the left (towards the bottom of FIG. 4A), which effects a counter clockwise rotation of the ring bearing 44. The clip 46 may rotate with the ring bearing 44 in the counter clockwise direction, which, transferring the motion through the bellcrank 48, may cause the sensing cylinders 52 to expand or compress to displace oil to/from the steering cylinder 53, which co-acts with the turntable 18 to cause the turntable 18 to rotate in the clockwise direction. The clockwise rotation of the turntable 18 may turn the axles 14 and wheels 16 of the rear module 28 to the right (towards the top of FIG. 4A). Thus, a left turn of the cab may cause the wheels 16 of the rear module 28 to turn to the right to aid the trailer 24 in turning, based on the steering arrangement described. A right turn by the cab may pull the beam to the right (towards the top of FIG. 4A), which effects a clockwise rotation of the ring bearing 44. The clip 46 may rotate with the ring bearing 44 in the clockwise direction, which transferring the motion through the bellcrank 48, may cause the sensing cylinders 52 to expand or compress to displace oil to/from the steering cylinder 53, which co-acts with the turntable to cause the turntable 18 to rotate in the counterclockwise direction. The counter clockwise rotation of the turntable 18 may turn the axles 14 and wheels 16 of the rear module 28 to the left (towards the bottom of FIG. 4A). Thus, a right turn of the cab may cause the wheels 16 of the rear module 28 to turn to the left to aid the trailer 24 in turning, based on the steering arrangement described. It will be appreciated that the wheels 16 of the front module 26 may be steered (instead of the wheels 16 of the rear module) in a similar way when the ring bearing 44 is connected to and co-acts with the axles 14 of the front module 26.

With continued reference to FIGS. 3A-4B, in one non-limiting embodiment, the ring bearing 44-bellcrank 48 steering arrangement may further include a rod 54 connecting each turntable 18 to an adjacent turntable 18. In this way, a rod 54 may be positioned between each adjacent turntable 18 to connect adjacent turntables 18 to each other. The adjacent turntables 18 may be connected to one another using a single rod 54 or a plurality of rods 54. The rods 54 are configured to rotate a turntable when the adjacent turntable 18 is rotated. In some non-limiting embodiments, the turntable 18 connected to the steering cylinder 53 is connected to the steering cylinder 53 on one end and connected to the rod 54 on the other end to connect the turntable 18 closest to the steering cylinder 53 to its adjacent turntable 18. In this non-limiting embodiment, the steering cylinder 53 may cause rotation of the turntable 18 to which they are connected (because of the rotation of the ring bearing 44), which may cause rotation of the adjacent turntable 18 by the rod 54. Thus, rotation of the ring bearing 44 may cause the rotation of the turntable 18 closest thereto (to turn the axle 14), which causes the rotation of downline turntables 18 in that module connected to one another via rods 54 (to turn the remaining of the plurality of axles 14 in that module, e.g., the rear module 26 or the front module 26). In some non-limiting embodiments, the connection between the adjacent turntables 18 may be some other member other than the rod 54 which causes the adjacent turntables 18 to co-act with one another upon rotation of one of the turntables 18. Based on this description, each axle 14 co-acts individually with its own turntable 18 such that each axle 14 may turn individually, and the adjacent turntables 18 may co-act with adjacent turntables 18 such that turning of one turntable 18 may turn the adjacent turntable. In this way, the axles 14 are capable of turning individually and in combination with one another.

The above-described ring bearing 44-bellcrank 48 steering arrangement describes steering of the trailer 24 in automatic mode, and automatic mode does not require a power unit to operate. Referring to FIGS. 3A-4B, the trailer 24 may be alternatively driven in a manual mode. Manual mode may bypass the sensing cylinders 52 to steer the trailer 24. The trailer 24 may include at least one power unit 56 to steer the trailer 24 in manual mode. The power unit 56 may be configured to allow a steersman to manually turn at least one axle 14 via the turntables 18 (thus turning the wheels 16) of the front module 26 and/or the rear module 28. The power unit 56 may allow for each axle 14 of the front module 26 and/or rear module 28 to be turned manually (relative to the frames 12) and may allow for a single axle 14 or any combination of the axles 14 of the front module 26 and/or rear module 28 to be turned manually. The plurality of axles 14 in the trailer 24 may turn in manual mode while the trailer 24 is stationary. This may allow for more precise control over the turning of the trailer 24, which may be useful for particularly tight or otherwise difficult turns. In some non-limiting embodiments, the power unit 56 may turn the axle(s) 14 manually when the trailer 24 is stationary (before beginning movement). This may allow the trailer 24 to begin a turn immediately when starting movement from a stationary position. In manual mode, the power unit 56 may cause oil to be displaced to/from the steering cylinder 53 such that the steering cylinder 53 may suitably co-act with the turntable 18 to turn the axle 14.

Any combination of automatic mode and manual mode maybe used for the front module 26 and the rear module 28 of a trailer 24. In one example, the front and rear module 26, 28 of the trailer 24 may both be steered in automatic mode and manual mode. In one example, the front module 26 may be steered in manual mode, while the rear module 28 may be steered in manual mode and/or automatic mode. In one example, the front module 26 may be steered in manual mode and/or automatic mode, while the rear module 28 may be steered in manual mode.

Referring back to FIGS. 2A-2C, the trailer 24 may include the sensor 49 as the steering device as opposed to the bellcrank 48. The sensor 49 may be operatively connected to the ring bearing 44 and sense the degree and direction of the ring bearing 44 rotation (because of the turning of the cab and load 22). The sensor 49 may communicate (e.g., wirelessly or through a wired connection) with the power unit 56, which causes oil to be displaced to/from the steering cylinder 53 to effect rotation of the axles 14. The sensor 49 may determine the amount of oil to displace to/from the steering cylinder 53 to determine the degree to which the axles 14 rotate based on the degree and direction of rotation of the ring bearing 44 sensed by the sensor 49.

Figure 5A:
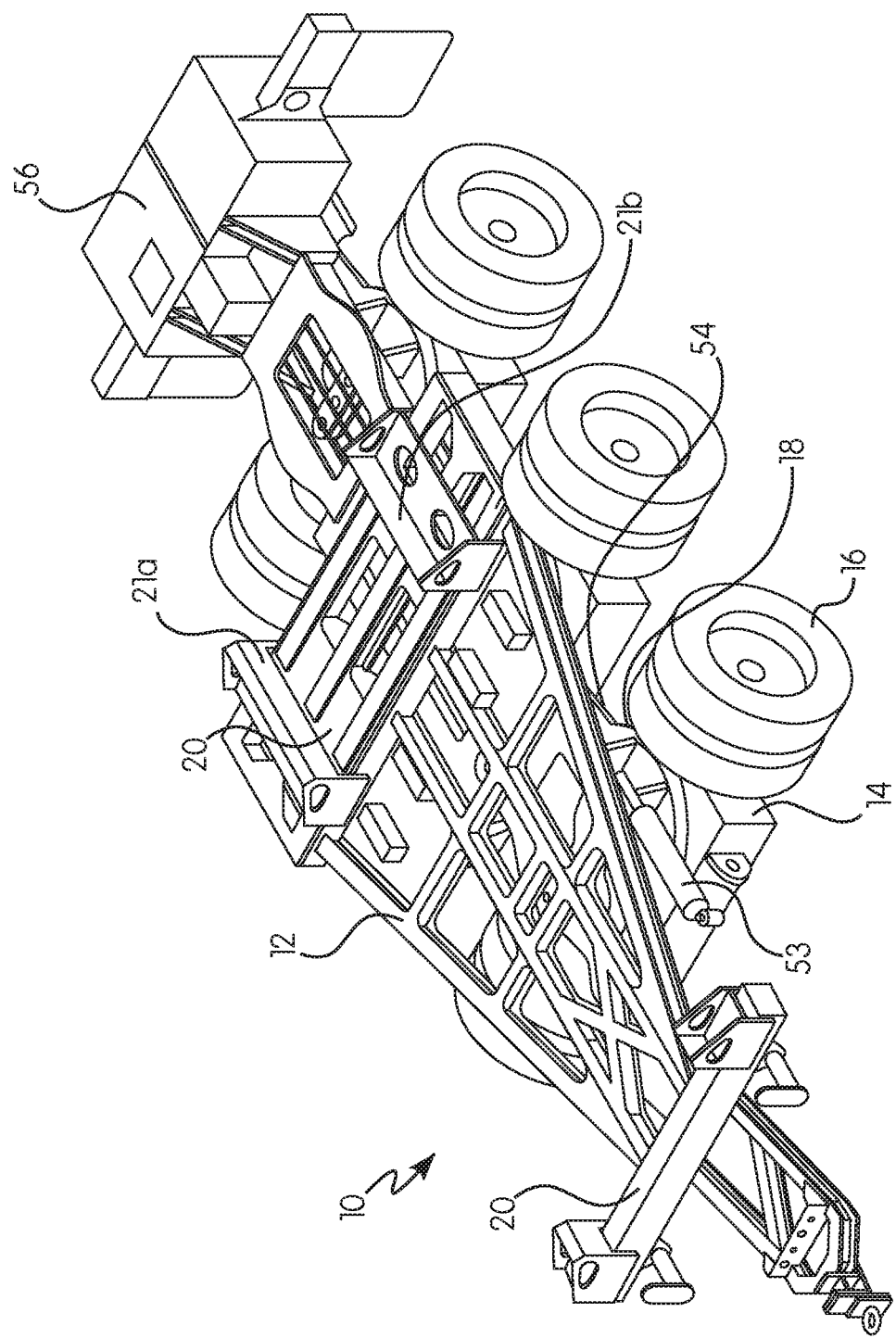
FIG. 5A shows a perspective view of a front 3-axle dolly.
Figure 5B:
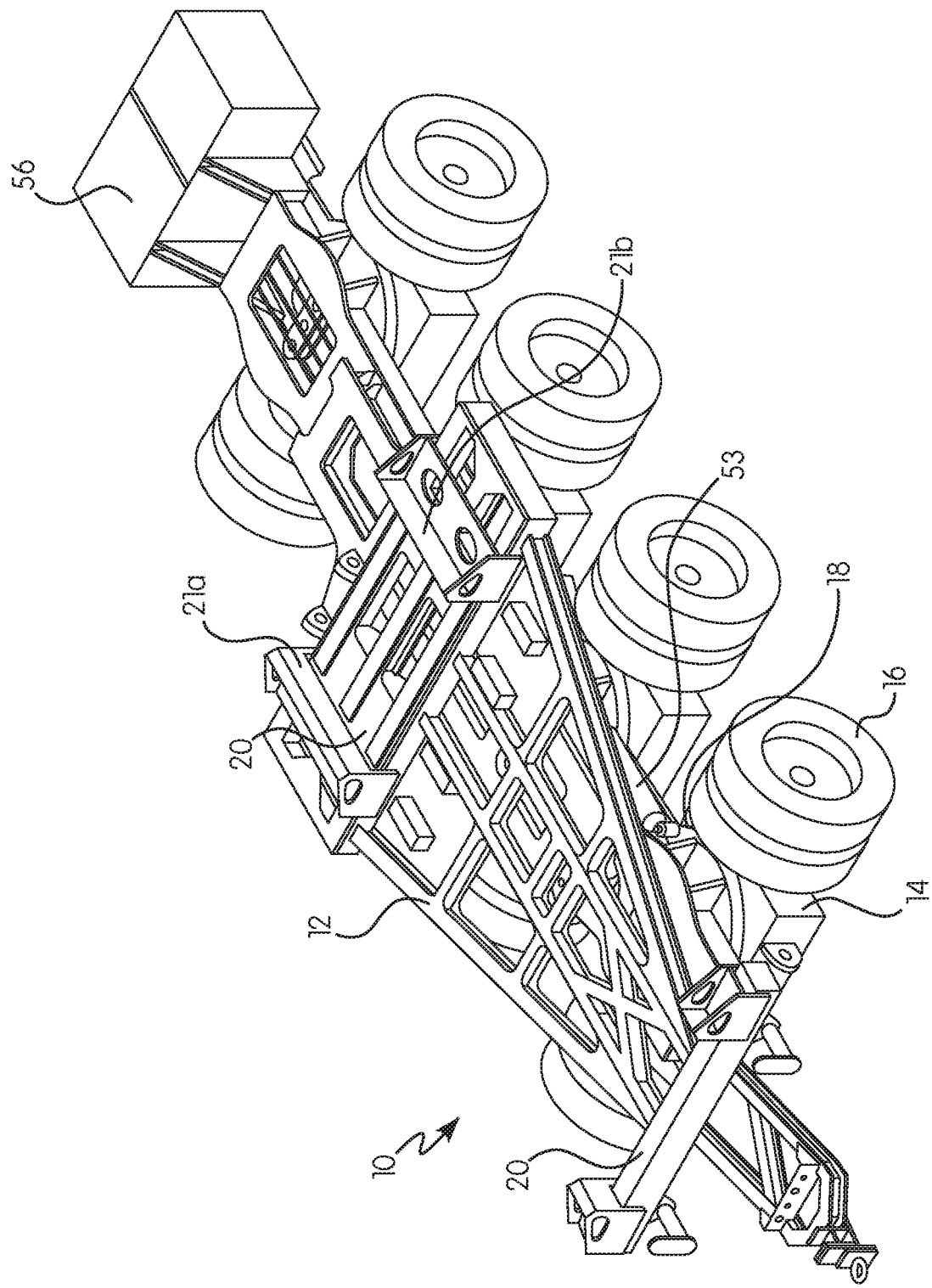
FIG. 5B shows a perspective view of a front 4-axle dolly.
Figure 5C:
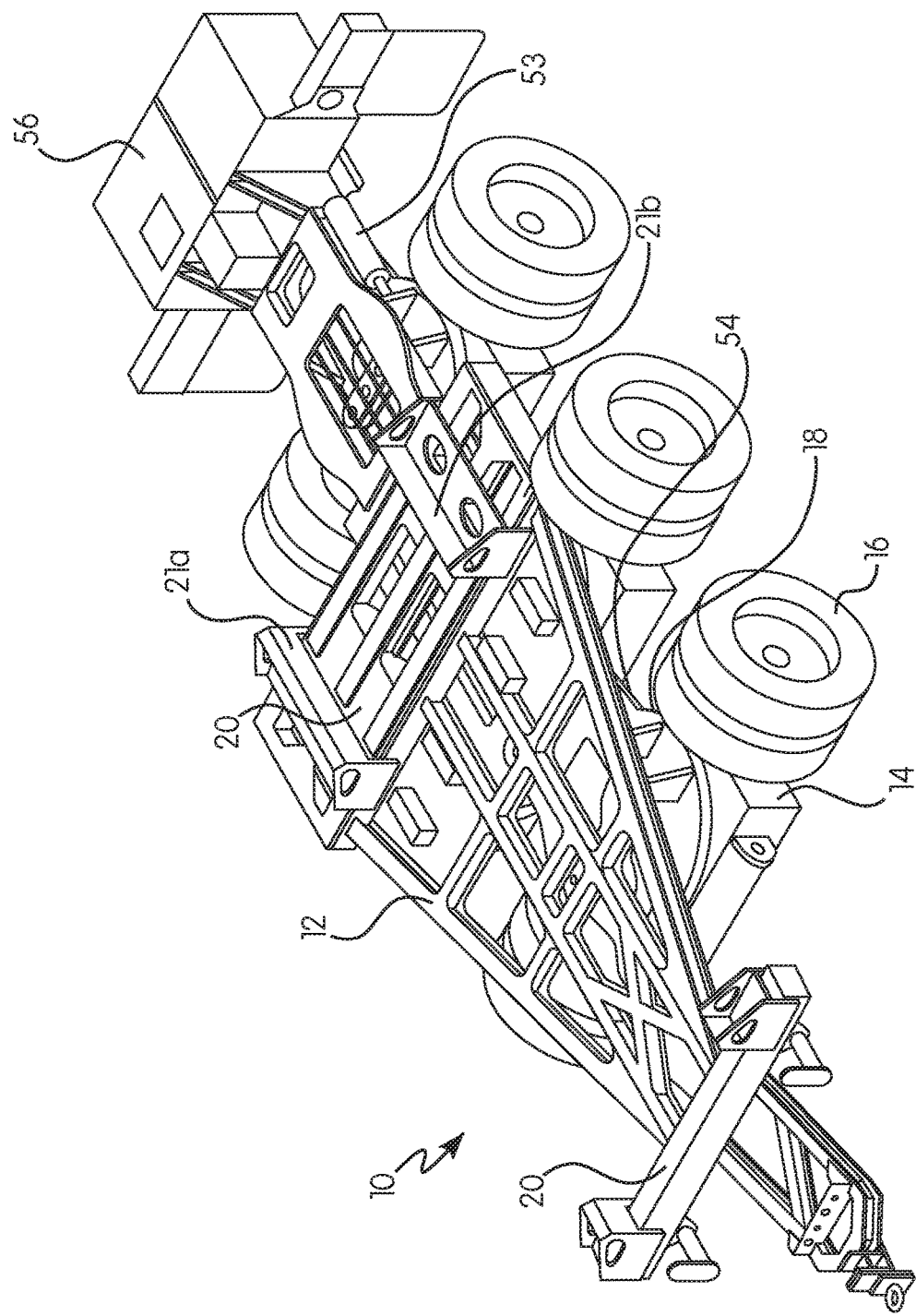
FIG. 5C shows a perspective view of a rear 3-axle dolly.
Figure 5D:
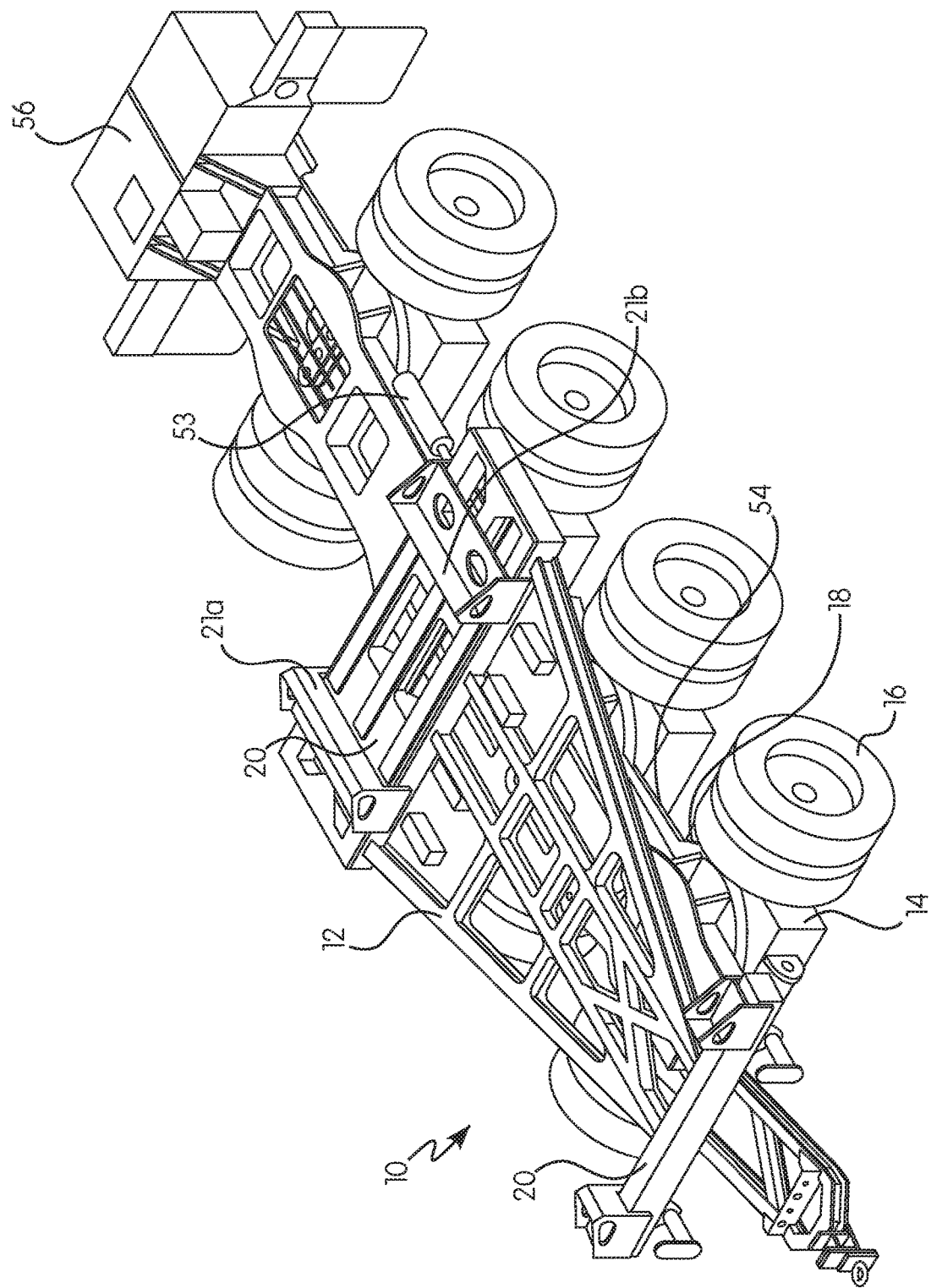
FIG. 5D shows a perspective view of a rear 4-axle dolly.

Referring to FIGS. 5A-5D, various additional non-limiting examples of the dolly 10 are shown. FIG. 5A shows a perspective view of a front 3-axle dolly 10. FIG. 5B shows a perspective view of a front 4-axle dolly 10. FIG. 5C shows a perspective view of a rear 3-axle dolly 10. FIG. 5D shows a perspective view of a rear 4-axle dolly 10. The dollies 10 shown in FIGS. 5A-5D may be used as a module in the modular trailer 24 including a previously described center module 34 to connect the front dolly to the rear dolly.

In some examples, the dollies 10 shown in FIGS. 5A-5D may be directly connected by themselves to a cab or second trailer to be backhauled. In some non-limiting examples, a dolly 10 from FIG. 5A-5D may be used as a trailer to haul a load 22 without being used as part of the modular trailer 24 described herein. A back end of a load 22 may be placed on the dolly 10 with the front end of the load placed on a second trailer attached to a cab or to the cab itself (such as to the fifth wheel of the cab) to tow the load 22. The 10 dolly may not be attached to the cab or the second trailer except for by the load 22 received by dolly 10 and the cab or second trailer. The frame 12 of the dolly 10 may stay in-line with the load 22 spanning between the dolly 10 and the cab or second trailer during a turn, and the axles 14 may turn to steer the dolly 10.

The dollies 10 may include a power unit 56 to steer the axles 14 of the dollies 10. The power unit 56 may steer each axle 14 of the dollies 10 individually, with each axle 14 being individually mounted on its own turntable 18. The power unit 56 may cause oil to be displaced to/from the steering cylinder 53 to cause the steering cylinder 53 to co-act with the turntable 18 to turn the axle 14.

Figure 6A:
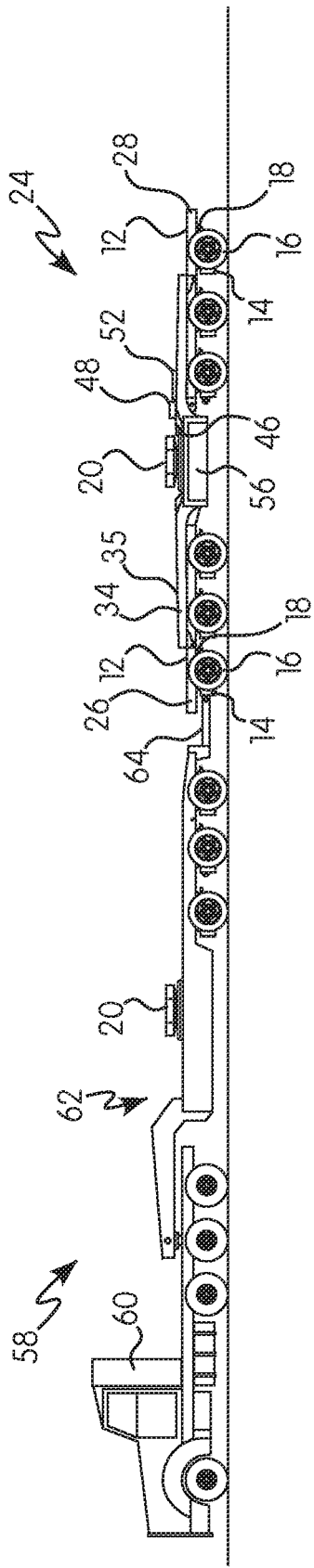
FIG. 6A shows a side view of a towing system used for back hauling.
Figure 6B:
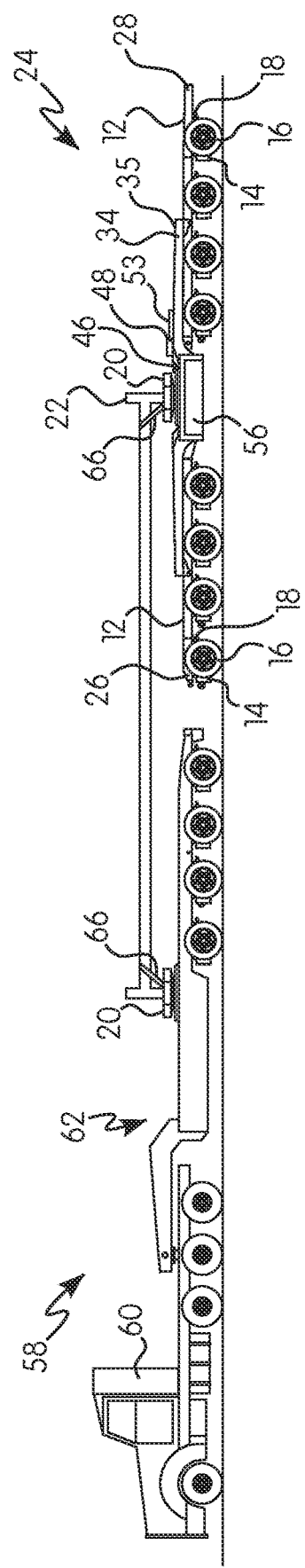
FIG. 6B shows a side view of a towing system for hauling a load spanning a trailer according to the present invention and a second trailer connected to a cab.

Referring to FIGS. 6A and 6B, non-limiting embodiments of towing systems 58 are shown. The towing system 58 may include a cab 60, which may be a motorized vehicle configured to tow a load 22. The towing system 58 may also include a front trailer 62 (also referred to herein as a "second trailer"), and the front trailer 62 may be connected to the cab 60. The front trailer 62 may be configured to haul a load 22. The front trailer 62 may include a platform 20 to receive the load 22. The towing system 58 may also include a rear trailer 24, which is the trailer 24 of the present invention as described above. The front trailer 62 may co-act with the rear trailer 24 to haul a load 22 spanning both the front trailer 62 and the rear trailer 24. In some non-limiting embodiments, the front trailer 62 is optional, and the front end of the load 22 may be instead received by the cab 60, such as at the fifth wheel of the cab 60 to haul a load 22 spanning both the cab 60 and the rear trailer 24.

Referring to FIG. 6A, the towing system 58 may be used for backhauling the rear trailer 24. A tie bar 64 may connect the front trailer 62 or cab 60 and the rear trailer 24 to keep the towing system 58 together during backhauling of the rear trailer 24. The tie bar 64 may be connected to one of the axles 14 and/or the turntables 18 of the rear trailer 24

Referring to FIG. 6B, the towing system 58 may include a load 22 having a front portion and a rear portion, the front portion may be received by the front trailer 62 or cab 60 and the rear portion received by the rear trailer 24. The load 22 may be a long beam, for example. The beam may be secured to the front trailer 62 or cab 60 and rear trailer 24 using the fasteners 66. Thus, the rear trailer 24 may not be connected to the front trailer 62 or cab 60 except by the load 22 received by the front trailer 62 or cab 60 and the rear trailer 24.

Figure 7:
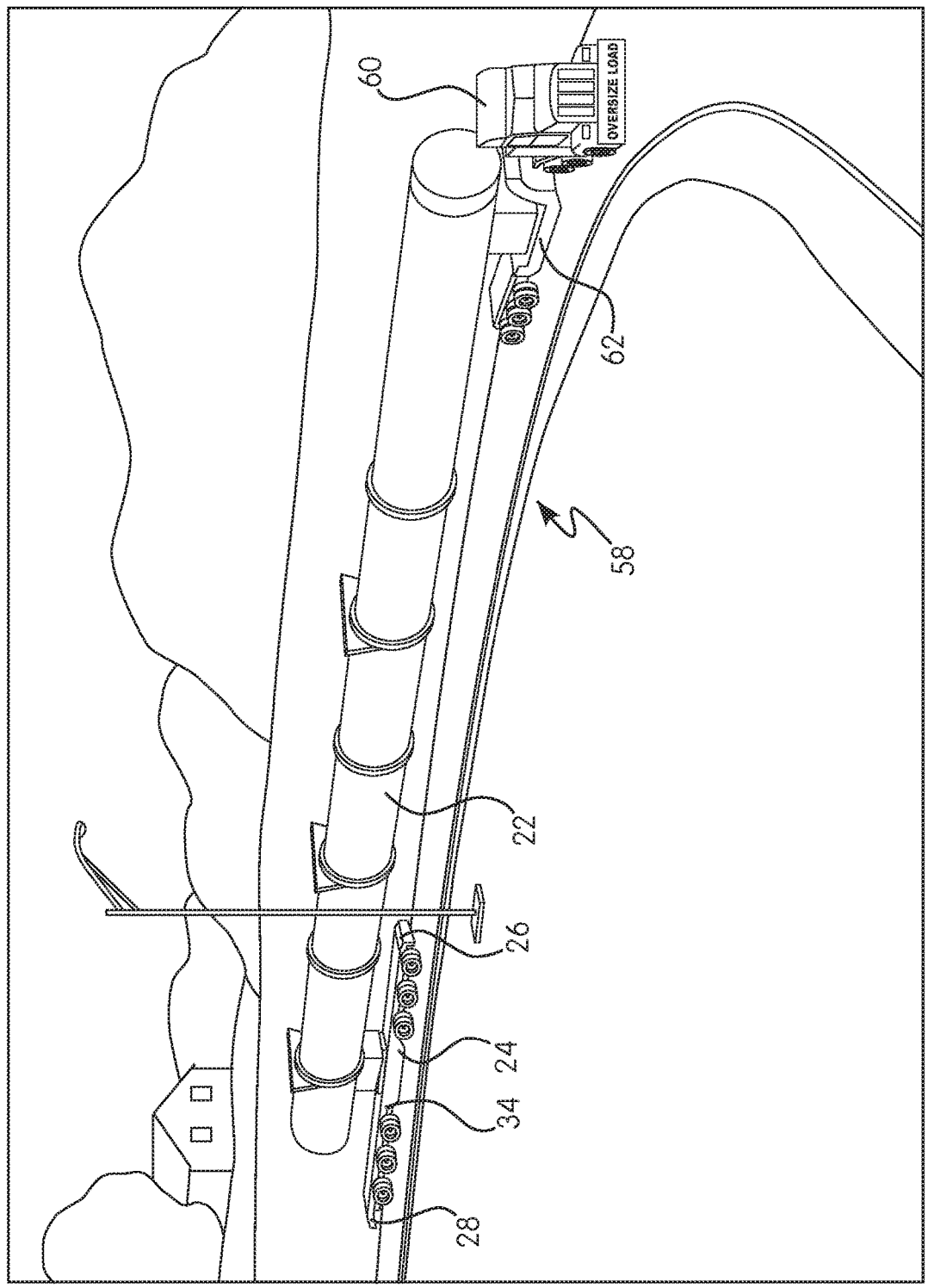
FIG. 7 shows a perspective view of a towing system.

Referring to FIG. 7, a non-limiting example of the towing system 58 of the present invention hauling a load 22 is shown. FIG. 7 shows the towing system 58 in transit and making a turn. This illustrated example shows the towing system 58 without the tie bar 64 such that the load 22 holds the front trailer 62 and the rear trailer 24 together.

Figure 8:
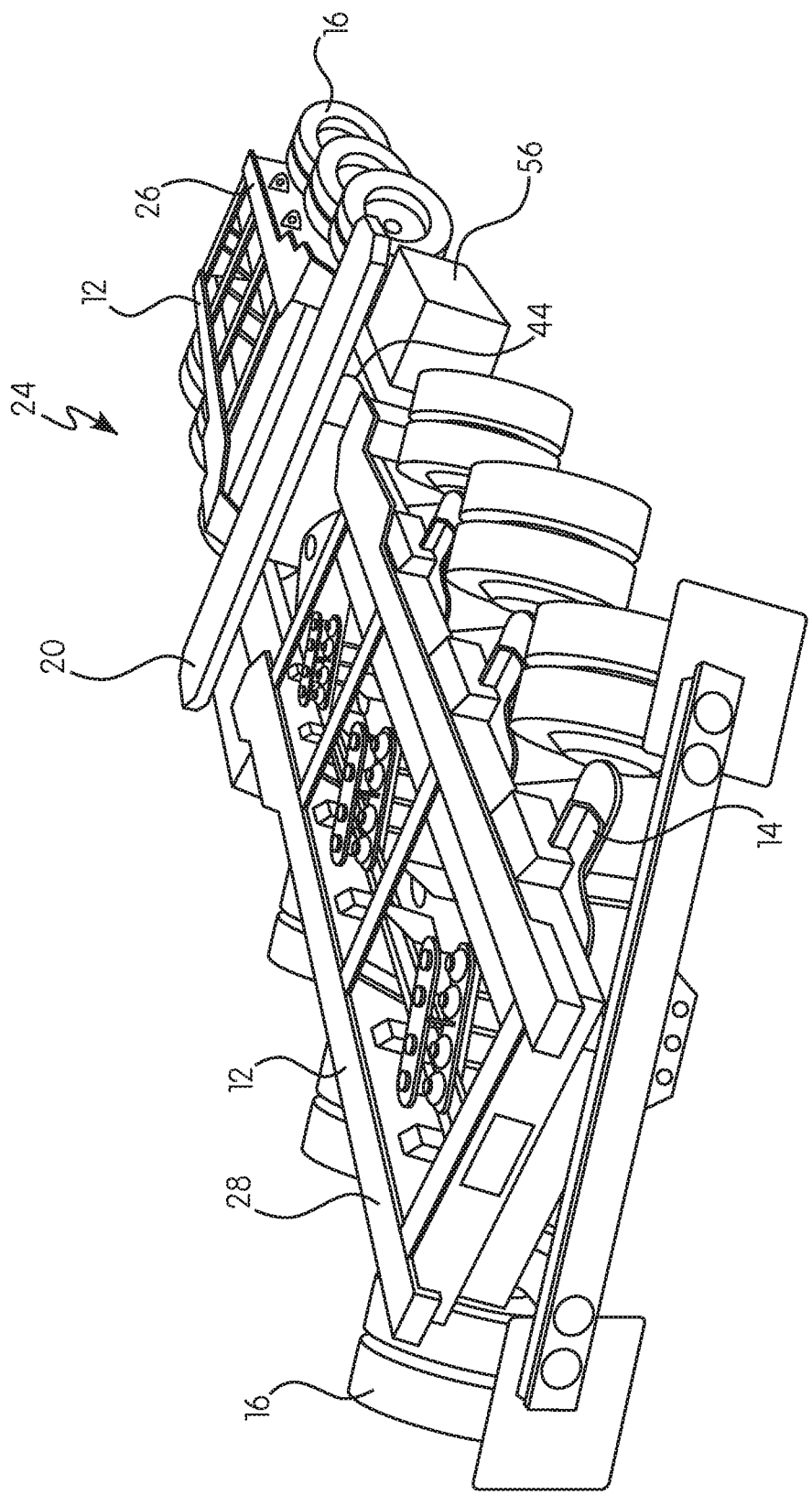
FIG. 8 shows a perspective view of a trailer.
Figure 9A:
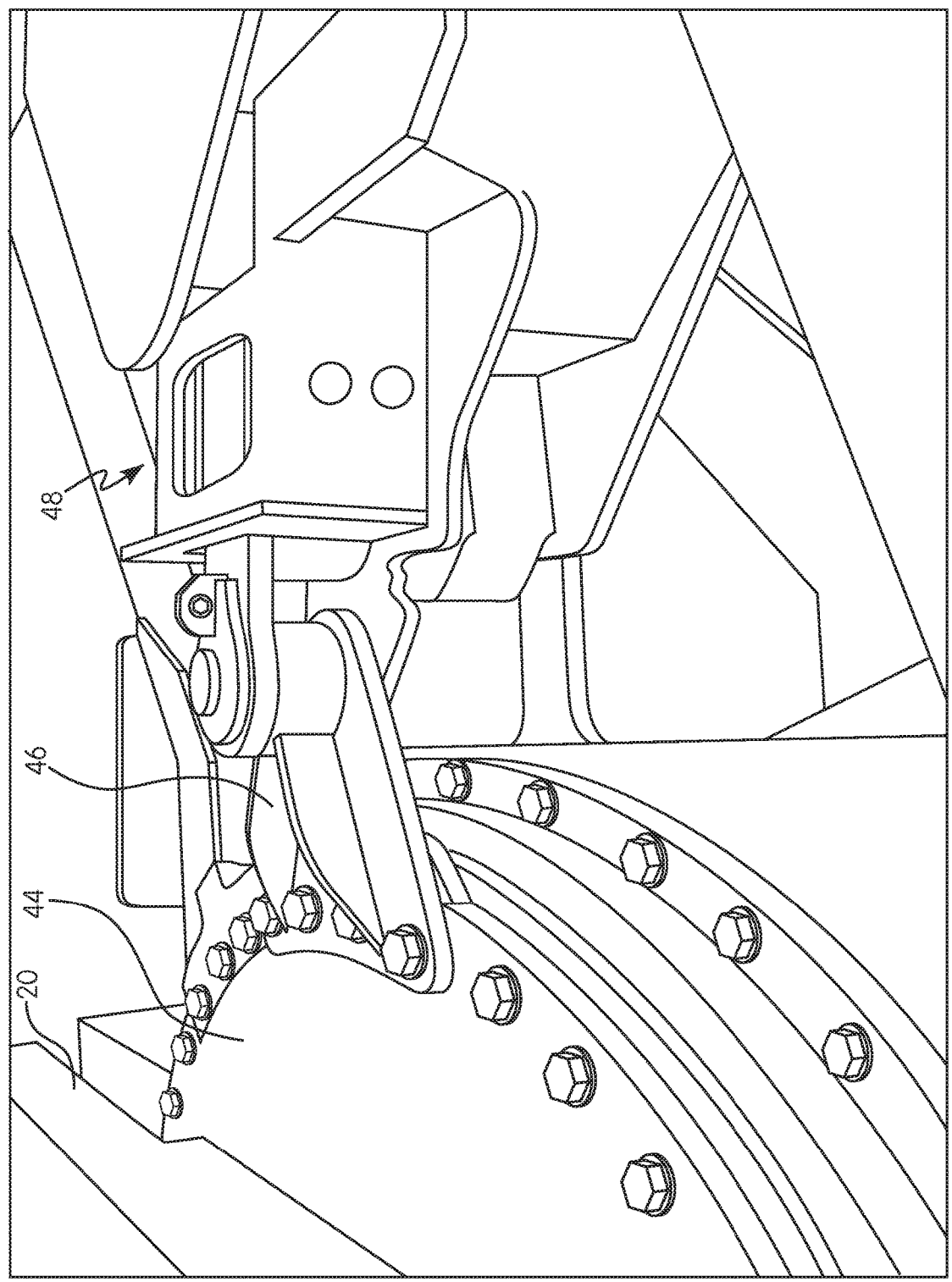
FIG. 9A shows a ring bearing bell-crank steering arrangement used in a trailer according to the present invention.
Figure 9B:
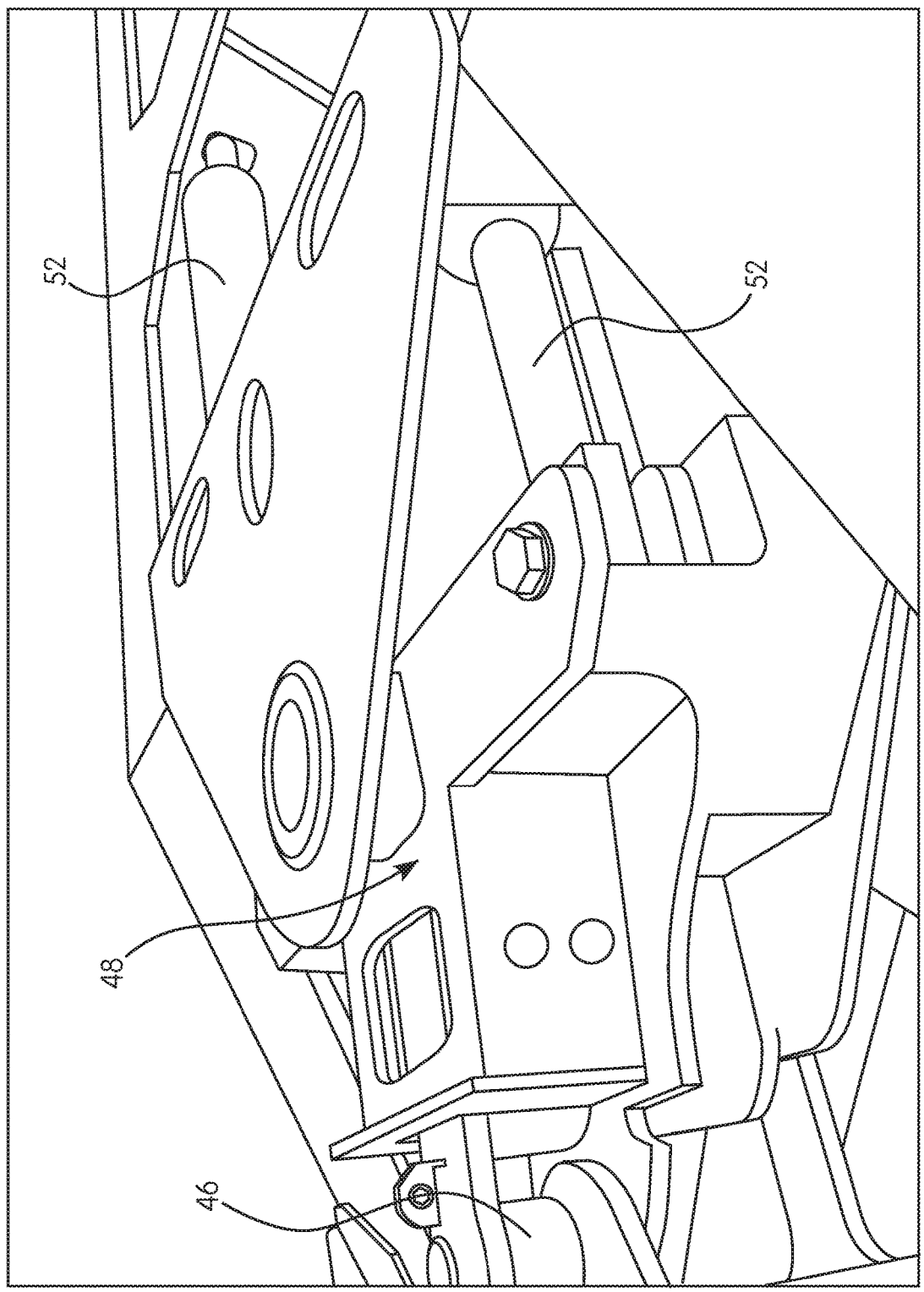
FIG. 9B shows the ring bearing bell-crank steering arrangement of FIG. 9A.
Figure 9C:
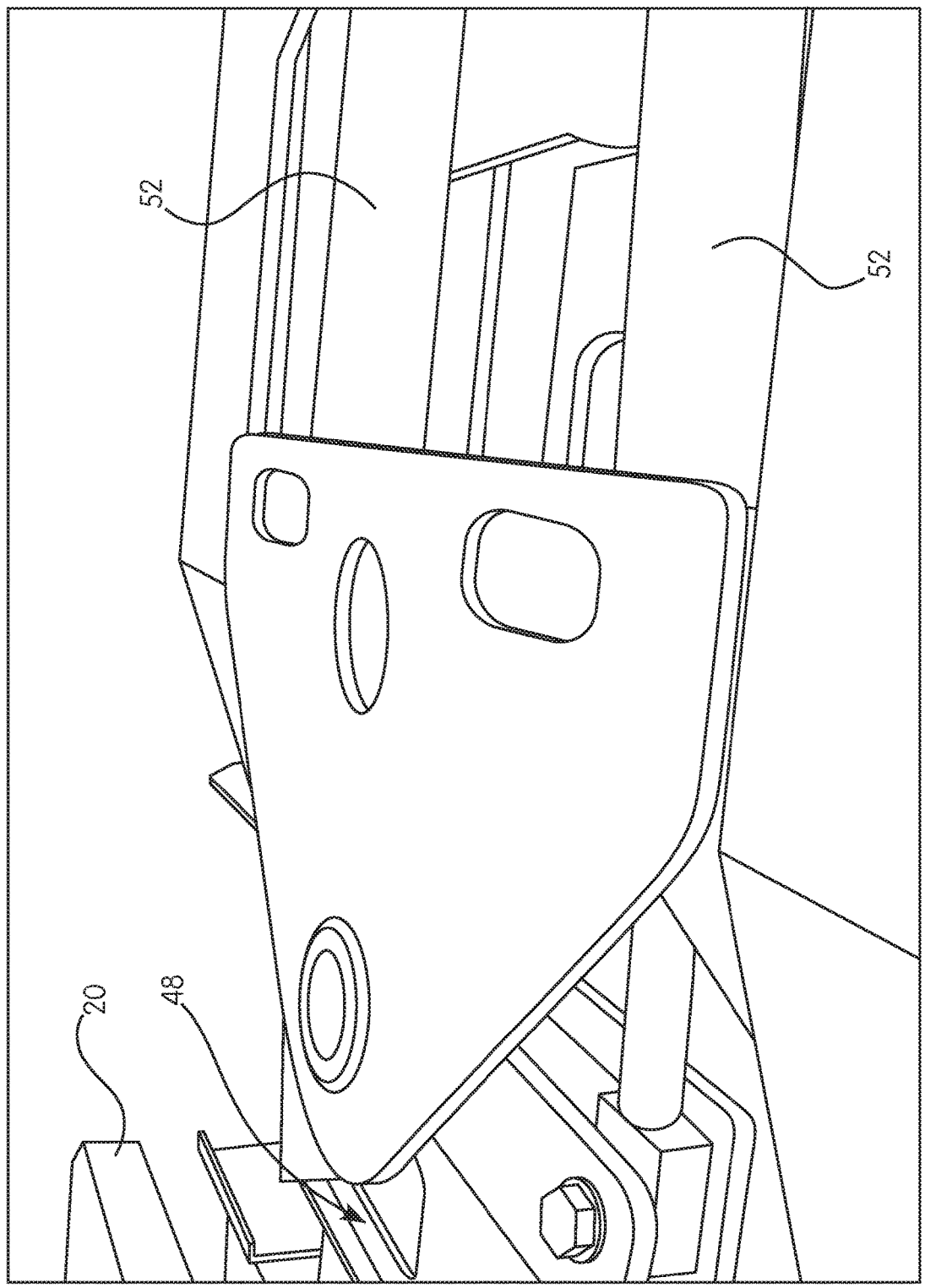
FIG. 9C shows the ring bearing bell-crank steering arrangement of FIG. 9A.
Figure 9D:
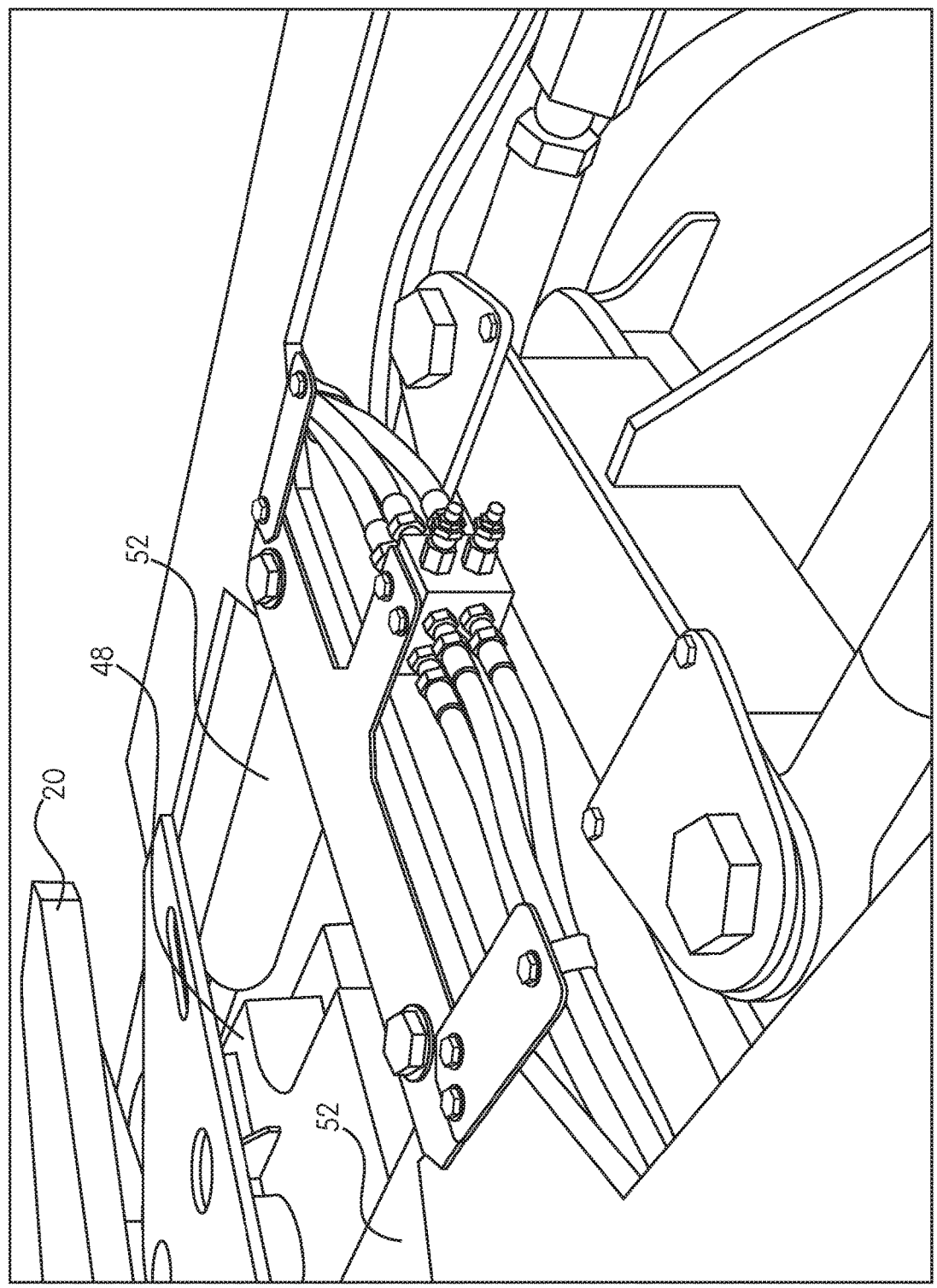
FIG. 9D shows the ring bearing bell-crank steering arrangement of FIG. 9A.

Referring to FIG. 8 a non-limiting embodiment of the trailer 24 is shown. The trailer 24 includes the power unit 56 for effecting a manual mode for driving the trailer 24. FIG. 8 shows the trailer 24 with the axles 14 and wheels 16 turned so that the trailer 24 may make a right turn. The axles 14 and wheels 16 of the front module 26 are turned to the right, and the axles 14 and wheels 16 of the rear module 28 are turned to the left.

Referring to FIGS. 9A-9D, various views of the above-described ring bearing 44-bellcrank 48 steering arrangement are shown. In this steering arrangement, the ring bearing 44 includes a clip 46 to which the bellcrank 48 is connected. Connected to the opposite side of the bellcrank 48 are two sensing cylinders 52 configured to effect rotation of the axles 14 (as previously described) upon rotation of the ring bearing 44.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

The invention claimed is:

1. A modular trailer comprising:
   a front module comprising a frame, a plurality of axles connected to the frame, and a plurality of wheels connected to each axle;
   a rear module comprising a frame, a plurality of axles connected to the frame, and a plurality of wheels connected to each axle;
   a center module comprising a frame having a front end and a rear end, the front end removably pinned to the front module and the rear end removably pinned to the rear module, the center module further comprising a bearing rotatable relative to the frame; and
   a steering device operatively associated with the bearing and co-acting with at least one of the axles such that rotation of the bearing effects turning of the at least one axle.

2. The modular trailer of claim 1, wherein the steering device comprises a bellcrank connected to the bearing.

3. The modular trailer of claim 2, wherein the bellcrank is connected to a plurality of cylinders, wherein the plurality of cylinders co-act with a turntable of the at least one axle, such that rotation of the bearing effects turning of the at least one axle.

4. The modular trailer of claim 1, wherein the steering device comprises a sensor configured to sense a degree of rotation of the bearing.

5. The modular trailer of claim 1, wherein each of the plurality of axles co-acts with a turntable configured to effect turning of the axle, wherein each of the turntables is connected to an adjacent turntable by a rod.

6. The modular trailer of claim 1, wherein each of the plurality of axles turn individually relative to the frames.

7. The modular trailer of claim 1, wherein the bearing comprises a platform configured to receive a load.

8. The modular trailer of claim 7, wherein the load is a beam.

9. The modular trailer of claim 7, wherein movement of the load effects rotation of the bearing.

10. The modular trailer of claim 1, wherein the at least one axle is an axle of the front module, such that rotation of the bearing effects turning of the axle of the front module.

11. The modular trailer of claim 1, wherein each of the plurality of axles is configured to turn while the trailer is stationary.

12. The modular trailer of claim 1, further comprising at least one power unit configured to manually turn at least one axle of the front module and/or the rear module.

13. The modular trailer of claim 1, wherein the modular trailer co-acts with a cab or a second trailer to haul a load spanning both the modular trailer and the cab or second trailer.

14. The modular trailer of claim 1, wherein the center module is pinned to the front module and the rear module, such that the pinned front module, center module, and rear module together form a rigid frame unit.

15. A towing system comprising:
   a cab;
   at least one trailer according to claim 1; and
   a load received by the at least one trailer.

16. The towing system of claim 15, further comprising a front trailer connected to the cab, wherein the front trailer receives a front portion of the load and the at least one trailer is a rear trailer receiving a rear portion of the load,
   wherein the rear trailer is not connected to the front trailer except by the load received by the front trailer and the rear trailer.

17. The modular trailer of claim 1, wherein the at least one axle is an axle of the rear module, such that rotation of the bearing effects turning of the axle of the rear module.

18. The modular trailer of claim 17, wherein turning of the axle of the rear module effects turning of the remaining of the plurality of axles of the rear module.

* * * * *